United States Patent [19]

Higgins

[11] Patent Number: 4,833,184

[45] Date of Patent: May 23, 1989

[54] ACRYLATE POLYMER MODIFIED ASPHALT COMPOSITIONS

[75] Inventor: William A. Higgins, Gates Mills, Ohio

[73] Assignee: The Lubrizol Corporation, Wickliffe, Ohio

[21] Appl. No.: 24,188

[22] Filed: Mar. 10, 1987

[51] Int. Cl.$^4$ .............. C08L 95/00; C08L 33/08; C08L 33/10

[52] U.S. Cl. .................. 524/60; 524/62; 524/69

[58] Field of Search .............. 524/69, 60, 62

[56] References Cited

U.S. PATENT DOCUMENTS

| | | | |
|---|---|---|---|
| 2,486,487 | 11/1949 | Lowden | 260/28.5 |
| 2,972,588 | 2/1961 | Cohen | 260/17.4 |
| 3,414,533 | 12/1968 | Trieschmann et al. | 260/28.5 |
| 3,567,476 | 3/1971 | Masciantonio et al. | 106/277 |
| 3,849,355 | 11/1974 | Yamaguchi et al. | 524/69 |
| 3,869,988 | 3/1975 | Unbehaun et al. | 524/524 |
| 3,951,895 | 4/1976 | Anthenien et al. | 260/28.5 |
| 3,980,598 | 9/1976 | Moorwessel et al. | 260/28.5 |
| 4,018,730 | 4/1977 | McDonald | 260/17.4 R |
| 4,222,916 | 9/1980 | Hergenrother | 260/285 AS |
| 4,234,346 | 11/1980 | Latta et al. | 106/281 R |
| 4,244,747 | 1/1981 | Leonard et al. | 106/271 |
| 4,278,469 | 7/1981 | Yan et al. | 524/71 |
| 4,492,781 | 1/1985 | Duszak et al. | 524/59 |
| 4,511,689 | 4/1985 | Aldred et al. | 524/484 |
| 4,650,820 | 3/1987 | Decroix | 524/69 |
| 4,677,146 | 6/1987 | Senz | 524/69 |

FOREIGN PATENT DOCUMENTS 594455 11/1947 United Kingdom .......... 524/69

OTHER PUBLICATIONS

Mark et al., Encyclopedia of Polymer Science and Engineering, John Wiley & Sons, 1985, Second Edition, p. 260.

*Primary Examiner*—Allan M. Lieberman
*Attorney, Agent, or Firm*—William C. Tritt; Robert A. Franks; Joseph P. Fischer

[57] ABSTRACT

Modified asphalt compositions are described which comprise
(A) asphalt, and
(B) a minor effective amount, sufficient to improve the durability of the asphalt in service, of at least one hydrocarbon-soluble acrylate polymer of the formula

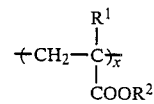

wherein $R^1$ is a lower alkyl group containing from 1 to about 4 carbon atoms, $R^2$ is a mixture of alkyl groups containing from about 4 to about 20 carbons atoms, and x is an integer providing a weight average molecular weight (Mw) to the acrylate polymer of about 5000 to about 1,000,000. Generally, the modified asphalt compositions will contain from about 0.01 to about 10% by weight, based on the weight of the asphalt, of the acrylate polymer as defined. The modified asphalt compositions of the present invention are useful in roofing and in preparing aggregate-containing asphalt concretes which can be employed as paving compositions.

2 Claims, No Drawings

ACRYLATE POLYMER MODIFIED ASPHALT COMPOSITIONS

TECHNICAL FIELD OF THE INVENTION

This invention relates to modified asphalt compositions and more particularly to modified asphalt compositions comprising asphalt and a minor amount, sufficient to improve the durability of the asphalt in service, of at least one hydrocarbon-soluble polymer of at least one alkyl acrylate. The modified asphalt compositions are useful in a variety of applications including roofing and paving. The modified asphalts are useful in preparing aggregate-containing asphalt concretes which can be employed as paving compositions.

BACKGROUND OF THE INVENTION

The term "asphalt" or "asphalt cement" as used in the description of the present application refers to any of a variety of solid or semi-solid materials at room temperature which gradually liquify when heated, and in which the predominant constituents are naturally occurring bitumens or which are obtained as residue in petroleum refining. Asphalt is further defined by Kirk-Othmer, Encyclopedia of Chemical Technology, Vol. 3, Third Ed. (1978) pp. 284–327, John Wiley & Sons, New York. An additional discussion appears in the publication entitled "A Brief Introduction to Asphalt and Some of its Uses", Manual Series No. 5 (MS-5), The Asphalt Institute, 7th Ed., September, 1974. Both of these references are hereby incorporated by reference.

Asphalt cements have found particular utility when combined with aggregates. Such combinations, generally referred to as "asphalt concrete", are employed extensively as paving compositions for roads, driveways, parking lots, airport runways, etc. The asphalt is converted to a fluid state when paving a road. One fluid form is the suspension or emulsion of the asphalt in water. After spreading and compressing the aggregate-containing asphalt, water evaporates or separates, and the asphalt hardens into a continuous mass. Another form of asphalt employed in road construction is a cutback, i.e., a liquid petroleum product produced by fluxing an asphaltic base with a suitable organic solvent or distillate. A road is formed by paving the aggregate-containing cutback and evaporating the volatile distillate from the mass. An advantage of using the above road construction techniques is the avoidance of high temperature application. In an alternative and most widely used technique, the asphalt and aggregate can be mixed and applied at elevated temperatures at the fluid state of the asphalt to form the road. This form of asphalt, which is neither cut-back nor emulsified generally is referred to as asphalt cement.

The degree and rate of hardening of asphalt cement during application and while in service ("age hardening") are factors affecting the durability of a surface such as a road pavement. A certain amount of hardening of a freshly applied surface is often desirable in order to allow the newly placed surface to be placed into service quickly. However, excessive hardening and loss of ductility of an asphalt based surface can dramatically reduce its useful lifetime. Januszke, in "Industrial Engineering Chemistry Product Research and Development", Vol. 10, (1971), 209–213, indicates that lead and zinc diethyldithiocarbamates were effective in inhibiting the adverse hardening.

In certain geographic areas, such as desert regions in the western and southwestern United States, deterioration of an asphalt road may occur quickly and is often extensive. Embrittlement and cracking of the road surface often results.

Because of the high demand for better quality materials for roofs and for the pavement of roads, airfields and other applications, there have been many suggestions in the art for producing improved asphaltic compositions.

It is known in the art that excessive age hardening of paving asphalts can be reduced through the use of certain antioxidants such as lead or zinc dithiocarbamates. The above-mentioned reference by Januszke discusses an evaluation of the effect of 24 antioxidants on paving asphalt durability and is incorporated by reference for its teachings regarding the problem and methods of assessing the performance of additives.

It also has been suggested, for example, that the properties of asphalt can be improved by incorporating into the asphalt, small amounts of polymeric materials. U.S. Pat. No. 2,486,487 describes potting and sealing compounds useful for impregnating coils and other electrical equipment, and these compositions comprise asphalts, synthetic waxes of the cetyl acetamide type and solid polymers of normal butyl methacrylate, particularly those having a softening point of about 65.5°–74° C. It is stated that the incorporation of the polymer results in a marked increase in the viscosity, and the blend exhibits good adhesion, flexibility and cold temperature resistance. Thermoplastic terpene hydrocarbon resins can be used in place of the polymers of butyl methacrylate.

A number of patents have described the modification of the properties of asphalt mixtures by including therein, copolymers and interpolymers of alkyl acrylates and alkyl methacrylates with olefinic monomers such as ethylene (U.S. Pat. Nos. 2,972,588; 3,414,533; 3,980,598; 4,492,781; and 4,511,689).

U.S. Pat. No. 3,567,476 describes a process for coloring bituminous materials. In the process, a resinous substance such as a latex and a pigment are mixed with the bituminous emulsions. A resinous substance and pigment coat the individual masked colloidal particles of bituminous material. A large number of suitable resinous substances are disclosed in this patent, and included among the substances are acrylic polymer latices.

U.S. Pat. No. 3,951,895 describes asphaltic compounds for use in paving and roofing in which an acrylic emulsion of a copolymer of methyl methacrylate and ethylacrylate is mixed with 1 to 3 parts of hydrated lime and 40 parts of sand. This acrylic emulsion then is blended with an asphalt emulsion.

U.S. Pat. No. 4,018,730 describes methods for emulsifying asphalt-rubber paving materials. The rubber materials which may be included in the asphalt paving material include a wide variety of natural as well as synthetic rubbers including acrylic rubber.

U.S. Pat. No. 4,222,916 describes coal tar emulsions containing sufficient acrylate emulsions to provide a desired viscosity. Sand may be added to the compositions. The acrylate emulsion is exemplified by butyl acrylate emulsion.

SUMMARY OF THE INVENTION

Modified asphalt compositions are described which comprise (A) asphalt, and (B) a minor effective amount, sufficient to improve the durability of the asphalt in service, of at least one hydrocarbon-soluble acrylate polymer of the formula

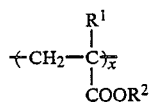

wherein $R^1$ is a lower alkyl group containing from 1 to about 4 carbon atoms, $R^2$ is a mixture of alkyl groups containing from about 4 to about 20 carbon atoms, and x is an integer providing a weight average molecular weight (Mw) to the polymer of about 5000 to about 1,000,000.

Generally, the modified asphalt compositions will contain from about 0.01 to about 10% by weight, based on the weight of the asphalt, of the acrylate polymer as defined. The modified asphalt compositions of the present invention are useful in roofing, paving and in preparing aggregate-containing asphalt concretes which can be employed as paving compositions.

DESCRIPTION OF THE PREFERRED EMBODIMENTS

The present invention relates to modified asphalt compositions, and more particularly, to modified asphalt compositions such as asphalt cements which, when combined with aggregates, will form asphalt concretes exhibiting improved physical properties, and, in particular, improved durability, over time, after application and hardening of the asphalt.

The asphalts which can be modified in accordance with the invention include natural asphalts and petroleum tar (petroleum asphalt) which is generally known for roofing and paving applications. The natural asphalt includes, for example, asphaltite such as gilsonite, grahamite and glance pitch; lake asphalt such as trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The petroleum tars that may be modified include oil gas tar obtained as a by-product when gases are produced from petroleum fractions, such tar in refined form, cut-back tar obtained by mixing a light petroleum fraction with such tar, and tar pitch obtained as a residue by removing the volatile fraction from such tar. Any of these kinds of asphalt may be used singly or jointly. Straight asphalt is preferred for paving applications and oxidized and blown asphalts are preferred for roofing applications.

As used herein, the term "asphalt cement" refers to any of a variety of substantially unblown or unoxidized solid or semi-solid materials at room temperature which gradually liquify when heated. Its predominant constituents are bitumens, which may be naturally occurring or obtained as the residue of refining processing. The asphalt cements are generally characterized by a penetration of less than 400 at 25° C, and a typical penetration is between 40 and 300 (ASTM Standard, Method D-5). The viscosity of asphalt cement at 60° C is more than about 65 poise.

Asphalt cements are often defined in terms specified by the American Association of State Highway Transportation Officials (AASHTO) AR viscosity system. Two sets of typical specifications are as follows.

| Test | AC 2.5 | AC 5 | AC 10 | AC 20 | AC 30 | AC 40 |
|---|---|---|---|---|---|---|
| Vis @ 140° F., poise (AASHTO T-202) | 250 ± 50 | 500 ± 100 | 1000 ± 200 | 2000 ± 400 | 3000 ± 600 | 4000 ± 800 |
| Vis @ 275° F., minimum, (AASHTO T-201) | 125 | 175 | 250 | 300 | 350 | 400 |
| Pen @ 77° F., minimum, (AASHTO T-49) | 220 | 140 | 80 | 60 | 50 | 40 |
| Flash Point, COC minimum, °F. | 325 | 350 | 425 | 450 | 450 | 450 |
| Ductility After TFOT (AASHTO T-179) @ 77° F., 5 cm/min minimum | 100 | 100 | 75 | 50 | 40 | 25 |
| Vis After TFOT (AASHTO T-179) @ 140° F., poise minimum |  | 1000 | 2000 | 8000 | 12000 | 16000 |

| Test | AR1000 | AR2000 | AR4000 | AR8000 | RT1600 |
|---|---|---|---|---|---|
| Vis @ 140° F., poise (AASHTO T-202) | 1000 250 | 2000 ± 500 | 4000 ± 1000 | 8000 ± 2000 | 16000 |
| Vis @ 275° F., CST minimum, (AASHTO T-201) | 140 | 200 | 275 | 400 | 550 |
| Pen @ 77° F., minimum, (AASHTO T-49) | 65 | 40 | 25 | 20 | 20 |
| % of Orig. | — | 40 | 45 | 50 | 52 |

| -continued | | | | | |
|---|---|---|---|---|---|
| AASHTO M-226 | | | | | |
| Pen @ 77° F., minimum | | | | | |
| Ductility @ 77° F., minimum, 5 cm/min | 100 | 100 | 75 | 75 | 75 |

Bitumens or asphalts are modified in accordance with the procedure of the invention by incorporating therein (B) a minor amount, effective to improve the durability of the asphalt, of at least one hydrocarbon-soluble acrylate polymer of the formula

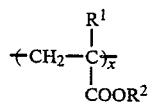

wherein $R^1$ is a lower alkyl group containing from 1 to about 4 carbon atoms, $R^2$ is a mixture of alkyl groups containing from about 4 to about 20 carbon atoms, and x is an integer providing a weight average molecular weight (Mw) to the acrylate polymer of about 5000 to about 1,000,000.

Preferably, $R^1$ is a methyl or ethyl group and more preferably, a methyl group. $R^2$ is primarily a mixture of alkyl groups containing from 4 to about 18 carbon atoms. In one embodiment, the weight average molecular weight of the acrylate polymer is from about 100,000 to about 1,000,000 and in other embodiments, the molecular weight of the polymer may be from 100,000 to about 700,000 and 300,000 to about 700,000.

Specific examples of the alkyl groups $R^2$ which may be included in the polymers of the present invention include, for example, n-butyl, octyl, decyl, dodecyl, tridecyl, octadecyl, hexadecyl, noctadecyl. The mixture of alkyl groups can be varied so long as the resulting polymer is hydrocarbon-soluble.

An example of a commercially available methacrylate ester polymer which has been found to be useful in the present invention is sold under the tradename of "Acryloid 702" by Rohm and Haas, wherein $R^2$ is predominantly a mixture of n-butyl, tridecyl, and octadecyl groups. The weight average molecular weight (Mw) of the polymer is about 404,000 and the number average molecular weight (Mn) is about 118,000. Another commercially available methacrylate polymer useful in the present invention is available under the tradename of "Acryloid 954" by Rohm and Haas, wherein $R^2$ is predominantly a mixture of n-butyl, decyl, tridecyl, octadecyl, and tetradecyl groups. The weight average molecular weight of Acryloid 954 is found to be about 440,000 and the number average molecular weight is about 111,000. Each of these commercially available methacrylate polymers is sold in the form of a concentrate of about 40% by weight of the polymer in a light-colored mineral lubricating oil base. In the following specific examples, when the polymer is identified by the tradename, the amount of material added to the asphalt is intended to represent an amount of the commercially available Acryloid material including the oil.

The above-described acrylate polymers can be combined with asphalt by techniques known in the art. Asphalts modified in this manner exhibit improved durability and age hardening characteristics such as ductility, and reduced deterioration.

Generally, the acrylate polymers will be mixed with asphalt in the fluid or molten condition to dissolve or disperse the acrylate polymers in the asphalt. Generally, the asphalt is heated to an elevated temperature to improve the fluidity of the asphalt. Temperatures of from about 100°–225° C. are sufficient although the precise temperature for any particular asphalt will depend on the source and nature of the asphalt material.

The amount of the acrylate polymer included in the modified asphalt compositions of the present invention is an amount which is sufficient improve the durability and retard degradation of the asphalt in service. In one embodiment, the amount of acrylate polymer should be sufficient to improve the ductility and flexibility of the asphalt on aging. In one embodiment, the amount of acrylate polymer will, vary from as little as 0.01% up to about 10% or more based on the weight of the asphalt. Most often, the amount of polymer incorporated in the asphalt will range from about 0.1 to about 3% or 5% by weight.

When mixing the acrylate polymers of the present invention with the asphalt material, the asphalt should be at an elevated temperature and in a flowable fluid state. By way of example, a suitable temperature is one at which the bitumen or asphalt is thinner than molasses at ambient temperature, typically thicker than water, and is flowable or pourable without stirring. Thus, a quantity of the asphalt should be sufficiently fluid to flow when placed on a solid surface. This is particularly advantageous if it is contemplated that the asphalt cement would be circulated under high speed agitation to provide a uniform dispersion or solution.

To accomplish the foregoing solution or dispersion, for a conventional asphalt cement (e.g., one designated AR-4000 by the American Association of State Highway and Transportation Officials (AASHTO), a suitable mixing temperature is on the order of a minimum of about 100° C. for soft asphalt, and, preferably, on the order of 120° C. or more. At temperatures below this level, mixing times for total dispersion, even if feasible, become excessive economically. On the other hand, the temperature of mixing should not be so high as to promote other reactions which could harm the asphalt material. For this reason, it is preferred not to heat the asphalt cement above about 225° C., and thus, suitable mixing temperatures are from about 100° C. to about 225° C. with a preferred mixing temperature of from 120°–180° C. depending upon the type of asphalt and the mixing times and speeds. At temperatures on the order of 170° C., 20 to 30 minutes are sufficient under conventional mechanical stirring speeds as with an impeller type stirrer. On the other hand, mixing times as low as several minutes may be sufficient under certain circumstances. In some instances, it may be desirable to perform the mixing step under an inert gas atmosphere such as nitrogen. The use of nitrogen precludes the presence of oxygen at elevated temperatures which tends to harden the final product.

The modified asphalt compositions of the present invention are particularly useful for preparing improved roofing asphalts, other asphalt coating compositions, and particularly for preparing improved aggregate-containing asphalts useful in surface treatments such as employed in the paving of roads, bridges, airport runways, sidewalks, etc. The modified asphalt compositions of the present invention in fluid form are mixed generally with preheated, predried aggregates to form the homogeneous mixture of uniformly coated aggregates in a paving composition, typically as performed at an asphalt mixing plant. The aggregate preferably is heated under conditions of time and temperature to drive off essentially all free moisture prior to mixing. During mixing, both the aggregate and the modified asphalt are typically at temperatures of about 100°–160 C. Before the composition is cooled to a temperature at which it looses its workability, the composition is spread on a road bed, compacted and permitted to cure. After curing, the road comprises aggregate bound by a matrix of modified asphalt binder.

The modified asphalt compositions of the present invention, after formation, may be handled by conventional techniques to maintain them in fluid form under road-building conditions. For example, the modified asphalts may be formed into a cutback by fluxing the asphalt with a suitable volatile solvent or distillate. The modified asphalt cutback may then be directly mixed with aggregate and applied as a paving composition in fluid form, possibly at ambient temperatures. Another conventional technique for fluidizing the modified asphalt cement prior to mixing with aggregate and forming into a paving composition is to emulsify the modified asphalt by known techniques. An advantage of this method of fluidizing is that after mixing with the aggregate, it may be applied as a paving composition at ambient temperature.

The term "aggregate" as used in the specification and claims is intended to include solid particles having a range of sizes including fine particles such as sand to relatively coarse particles such as crushed stone, gravel or slag.

The ratio of aggregate to modified bitumen or asphalt depends upon their properties and the desired end use. For typical road paving compositions, the paving composition will comprise a minimum of about 85% by weight of aggregate, and generally between about 90–96% by weight of the total paving composition will be aggregate.

Aggregate containing modified asphalt compositions can be prepared in accordance with the present invention by techniques known to the art. In one method, a modified asphalt cement is prepared in accordance with the method of the present invention, and the modified asphalt cement thereafter is mixed with an aggregate at an elevated temperature to form the desired paving composition.

The modified asphalt compositions of the present invention, and the aggregate containing asphalt compositions prepared utilizing the modified asphalt compositions of the present invention are characterized by an ability to retain their desirable characteristics in service. In particular, the modified asphalts of the present invention retain their consistency and ductility for longer periods in service than do asphalt compositions which have not been modified in accordance with the present invention.

The following examples illustrate the modified asphalt compositions and aggregate-containing compositions of the present invention.

EXAMPLE A

A Witco asphalt cement meeting the specification of AASHTO AR-4000 is modified with 2% by weight based on the weight of the asphalt, of the commercially available acrylate polymer "Acryloid 702" by thoroughly mixing 16.6 g of Acryloid 702 with 811.2 g of the fluidized asphalt (preheated to 149° C.).

EXAMPLE B

Acryloid 954 (15.9 g) is added to 777.6 g of preheated Witco AR-4000 and stirred. This modified asphalt contains 2% by weight of the Acryloid 954.

EXAMPLE C

The procedure of Example B is repeated except that 3% by weight of Acryloid 954 is incorporated into the asphalt.

EXAMPLE D

This example illustrates the preparation of an aggregate-containing asphalt composition in accordance with the present invention.

| Component | Amount % by Wt. |
|---|---|
| (1) Aggregate | 93.5 |
| (a) Crushed Canadian Limestone No. 8 | 49.2 |
| (b) Lake Sand | 50.8 |

| Gradation | % Passing |
|---|---|
| ½" | 100.0 |
| ⅜" | 98.0 |
| #4 | 60.0 |
| #16 | 46.5 |
| #50 | 10.8 |
| #200 | 1.8 |
| (2) Modified Asphalt of Example A | 6.5 |

Liquid asphalt cements treated with the compositions of the invention show major benefits in retained ductility and/or flexibility when exposed to severe aging as demonstrated by the California Tilt-Oven Asphalt Durability Test and an Extended Tilt-Oven Asphalt Durability Test. Measurements of low temperature elastic modulus, after accelerated laboratory aging in either test, show significant improvement obtained when the asphalt is modified with the acrylate polymers in accordance with the present invention.

The California Tilt-Oven Asphalt Durability Test was developed by California Department of Transportation personnel in an effort to establish an accelerated laboratory procedure to simulate field aging in hot climates. The method, as well as data correlating laboratory and field aging, is published in the AAPT 1981 Proceedings. The presentation is entitled "A Comparison of Field and Laboratory Environments on Asphalt Durability". The authors are Glenn R. Kemp and Nelson H. Predoehl. The test procedure is correlated to 24 months in a hot desert climate.

In the California Tilt Oven Asphalt Durability Test, a film of semi-solid asphaltic material (35 g) is heated at a plenum temperature of 111° C. for one week (168 hours). Heated air is blown over the sample. The effects of this age hardening are determined from measurements made on the residue.

In the Extended Tilt Oven Asphalt Durability Test, the same procedure is followed except that the sample is subjected to a plenum temperature of 100° C. for one week.

The effect of these two tests on samples of asphalt compositions modified in accordance with the present invention are summarized in the following tables.

TABLE I

Extended Tilt Oven Durability Test
(One Week at 100° C.)

| Property | AR-4000 Untreated | AR-4000 + 2% Acryloid 954 (Example B) | AR-4000 + 2% Acryloid 702 (Example A) |
|---|---|---|---|
| Pen. @ 77° F. (dmm) | | | |
| Unaged | 36 | 55 | 64 |
| Aged | 10 | 20 | 16 |
| Ductility @ 77° F. (cm) | | | |
| Unaged | 150+ | 150+ | 150+ |
| Aged | 13 | 150+ | 150+ |
| Viscosity @ 140° F. (Poise) | | | |
| Unaged | 2134 | 2047 | 1722 |
| Aged | 20,335 | 9864 | 9076 |

TABLE II

California Tilt Oven Durability Test
(One Week at 111° C.)

| Property | AR-4000 Untreated | AR-4000 + 3% Acryloid 954 (Example C) |
|---|---|---|
| Pen. @ 77° F. (dmm) | | |
| Unaged | 49 | 65 |
| Aged | 10 | 12 |
| Ductility @ 77° F. (cm) | | |
| Unaged | 150+ | 150+ |
| Aged | 14 | 35 |
| Viscosity @ 140° F. (Poise) | | |
| Unaged | 2302 | 1787 |
| Aged | 34,123 | 31,423 |

The improvement in ductility at 77° F. after these severe laboratory aging procedures is noteworthy. It indicates that a roof or pavement will retain flexibility and ductility after long exposure to weathering.

Conventional asphalt additives also may be included in the modified asphalt compositions of the invention. For example, organic manganese compounds such as manganese naphthenate, manganese acetate, manganese octoate either alone or in combination with organic cobalt compounds are useful in improving the high temperature properties and increasing compressive, flexural and fatigue strength of cured road pavements. Asphalts containing such additives are described in U.S. Pat. No. 4,234,346, and the specification of this patent is incorporated herein by reference for its disclosure of manganese and manganese cobalt additives for asphalt.

The use of manganese chloride to modify the properties of asphalt cements is described in U.S. Pat. No. 4,244,747. The disclosure of this patent is herein incorporated by reference. Other functional additives can be included to improve water resistance, high and low temperature characteristics and age hardening.

The modified asphalts of this invention are useful in surface treatments and may be applied as chip seals, fog seals, tack coats and slurry seals.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. An asphalt concrete composition, comprising:
   (A) at least 85 by weight of an aggregate; and
   (B) a modified asphalt composition, comprising:
      (i) an asphalt, and
      (ii) from about 0.01 to about 10% by weight of a hydrocarbon-soluble acrylate polymer of the formula

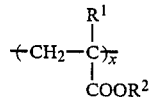

wherein $R^1$ is a lower alkyl group containing from 1 to about 4 carbon atoms, $R^2$ is a mixture of alkyl groups containing from about 4 to about 20 carbon atoms, and x is an integer providing a weight average molecular weight (Mw) to the acrylate polymer of about 100,000 to about 1,000,000.

2. The asphalt concrete composition of claim 1, wherein $R^1$ is a methyl group.

* * * * *